Figure 1:
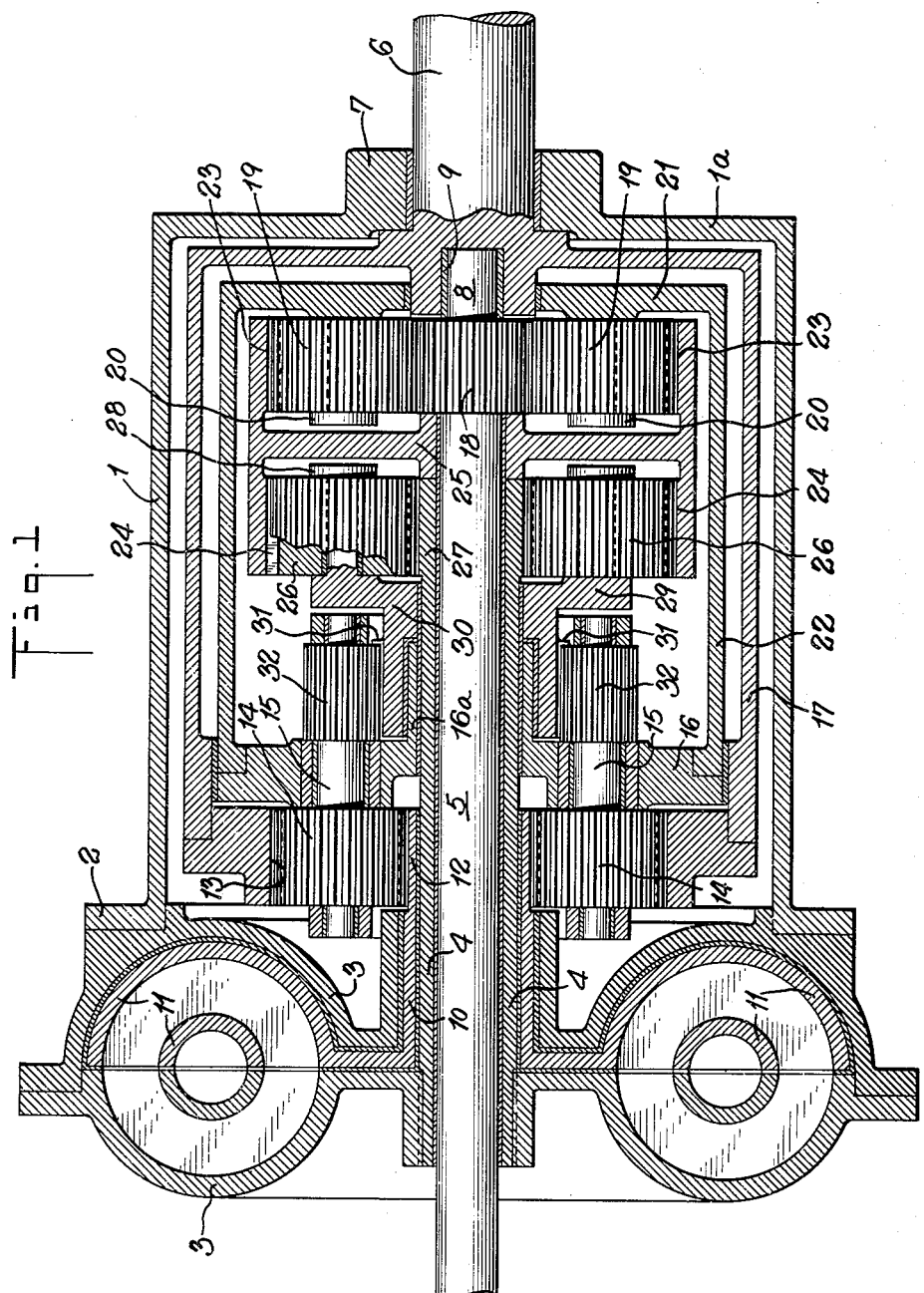

Nov. 2, 1965  C. BANCROFT  3,215,004
AUTOMATIC TRANSMISSION
Filed July 12, 1961  3 Sheets-Sheet 3

INVENTOR.
CHARLES BANCROFT
BY
Kenyon & Kenyon
HIS ATTORNEYS

United States Patent Office 3,215,004
Patented Nov. 2, 1965

3,215,004
AUTOMATIC TRANSMISSION
Charles Bancroft, Ferris Hill Road, New Canaan, Conn.
Filed July 12, 1961, Ser. No. 123,595
12 Claims. (Cl. 74—766)

This invention relates to automatic variable speed ratio, rotary power transmission devices. Internal combustion engines use such devices for connecting them to rotary loads of widely varying torques. One widespread application of such devices is, of course, exemplified by the automatic transmissions used by automobiles.

The object of the present invention is to provide an automatic transmission of comparatively simple construction affording a stepless variable speed ratio between the rotary power input and rotary output and rotary reaction members.

Briefly stated, this invention is an automatic transmission including a rotary input member and rotary output and rotary reaction members, and means for intergearing the output members for contra-rotation at widely varying differential speeds having a constant ratio therebetween. The input member has means for intergearing it with the just described means so that the differential speeds of the output and reaction members may vary widely relative to the input member's rotary speed while maintaining the constant speed ratio between the output and reaction members.

With the above arrangement, rotary power applied through the input member rotates one of the output and reaction members in the same direction as that of the input member, while rotating the other in the reverse direction. Means are provided for applying to the rotary reaction member a torque reaction which increases as this member's rotary speed increases. For example, this means may be a hydraulic coupling having its normally driven part fixed against rotation and its driving part connected to the reaction member to apply a reactive torque to the latter which increases with speed.

As described thus far, the rotary member not provided with the restaining means is used as the driving output member. This may be the member that rotates in the same direction as the input member. Rotative power applied to the input member is transmitted to this driving output member in proportion to the torque reaction applied to the reaction member. With a heavy load on the driving output member the latter rotates slowly with the reaction member connected to the torque reaction means rotating correspondingly faster. The latter shaft therefore receives a high torque reaction which is applied to the driving output member. When the load on the driving output member decreases, it turns correspondingly faster, relative to the input shaft's speed, while the speed of the shaft of the reaction member drops, the reaction on its correspondingly reducing.

It follows from the above that within limits an infinitely variable speed ratio transmission is provided, and its action is fully automatic although requiring relatively few parts.

The intergearing means required for the above may be provided by relatively simple planetary gear trains. These may be compactly arranged within a suitable transmission casing with which the hydraulic coupling is incorporated. Incidentally, although a hydraulic coupling has advantages, it could be substituted by other devices such as a mechanical clutch of the centrifugal type that grips with a force that increases with speed.

Figure 2:
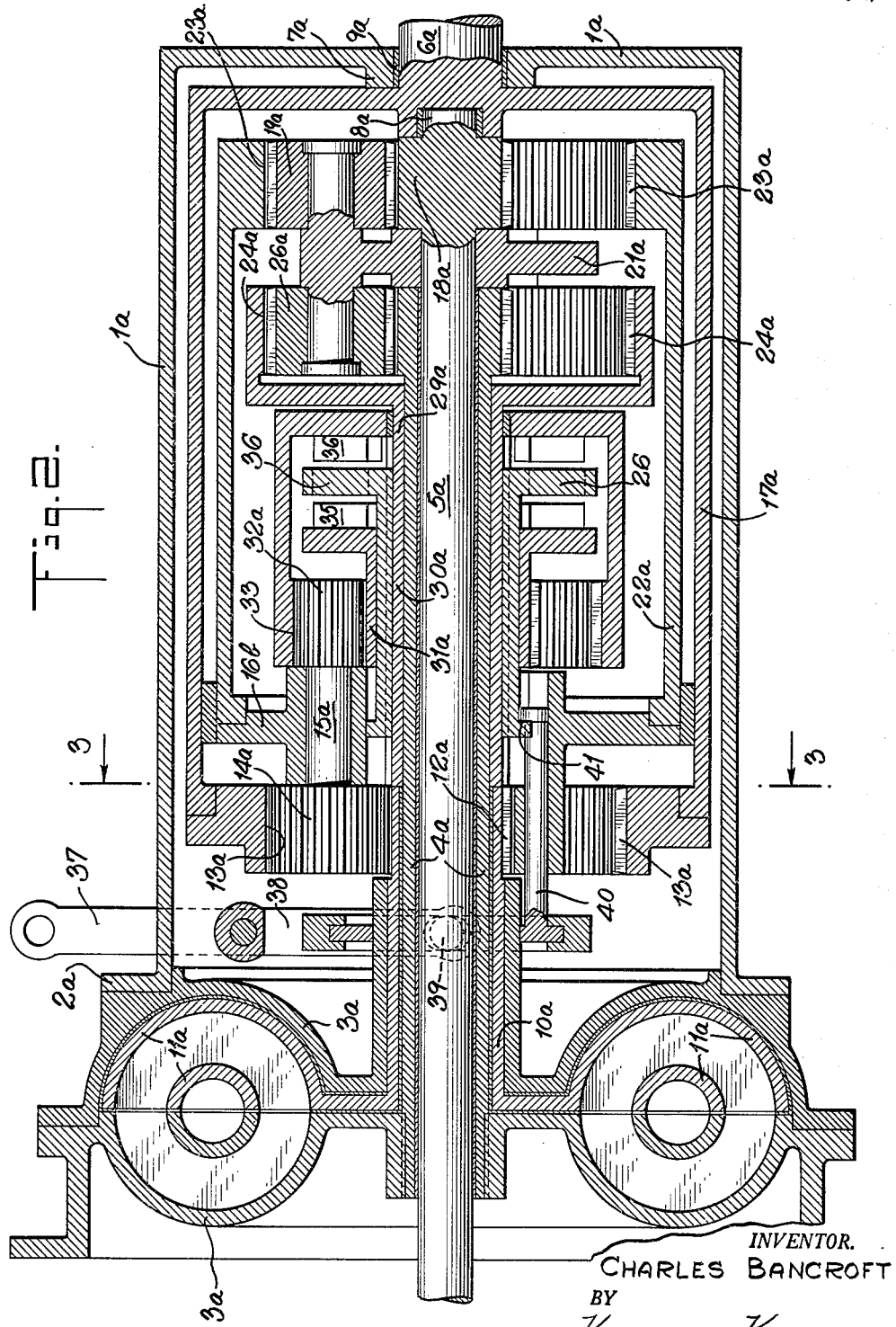
Figure 3:
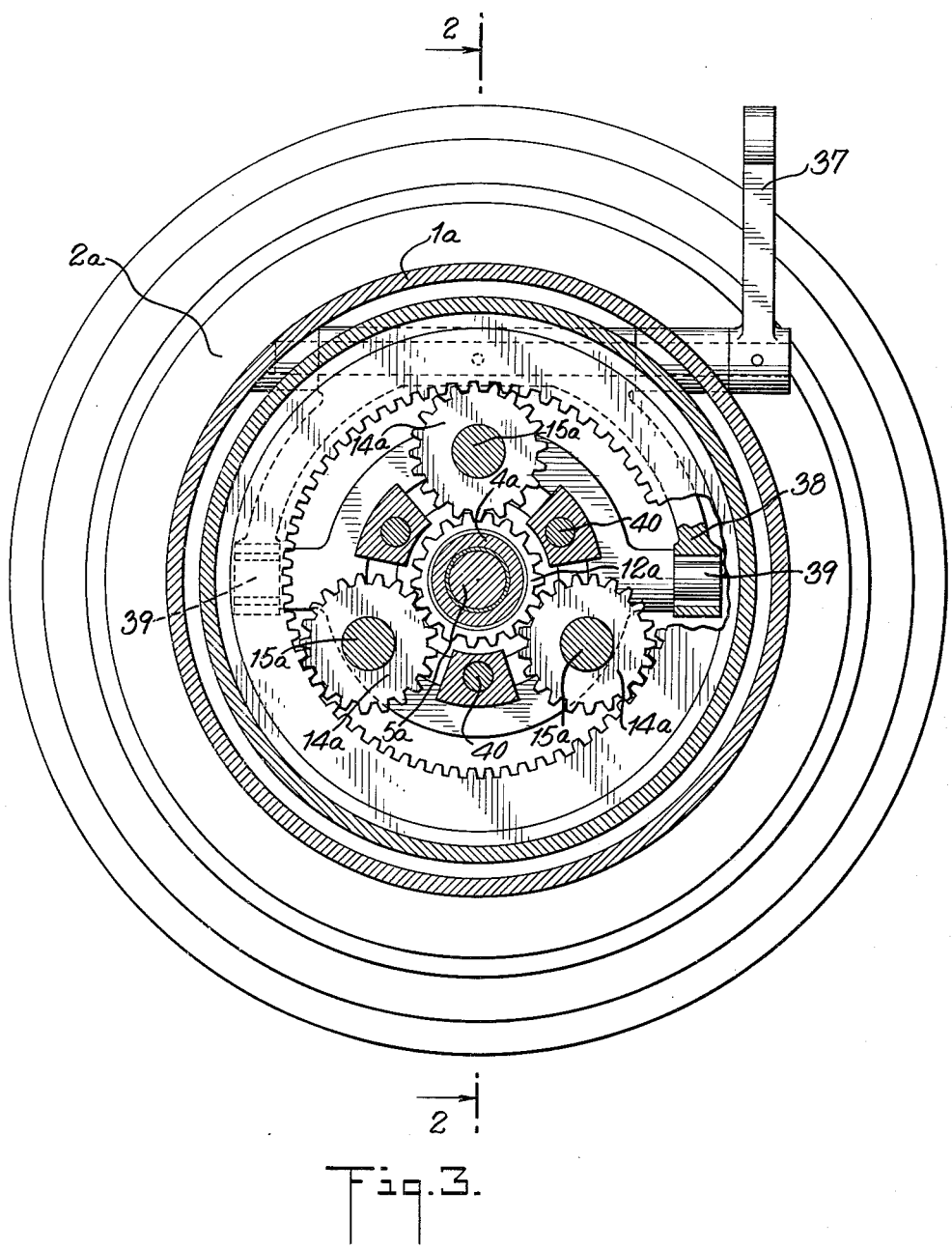

The accompanying drawings illustrate specific examples, the various figures being as follows:

FIG. 1 is a longitudinal section of a transmission providing one example;

FIG. 2 corresponds to FIG. 1 except that it shows the manner in which a reversing action may be attained; and FIG. 3 is a cross-section taken on the line 3—3 in FIG. 2.

In this first example a stationary cylindrical casing 1 has an outwardly extending end flange 2 to which the runner 3 of a hydraulic coupling is fixed stationary as by means of removable screws (not shown). This runner is constructed to form one end closure for the casing 1. At the axis of the casing 1 this end closure mounts a stationary inwardly extending tubular bearing member 4. The latter is long enough to extend to a location close to the opposite end of the casing 1, which is closed by an end wall 1a.

A rotary input member is formed by an input shaft 5 journalled within the tubular bearing 4. One of the rotary output members is formed by an output 6 journalled coaxially with the shaft 5 by a casing hub 7 formed in the end wall 1a. The end of the shaft 5 has a stub 8 journalled in a bearing 9 located in the end of the shaft 6 to provide rigidity but the two thus partly telescoped shafts 5 and 6 are free to rotate relative to each other.

The rotary reaction member is formed by a tubular shaft 10 which is journalled on the outside of the tubular bearing member 4. This tubular shaft 10 forms the hub of the impeller 11 of the previously mentioned hydraulic coupling. Liquid is confined within the runner 3 and as the impeller 11 rotates to centrifugally develop hydraulic flows between the impeller and runner, the latter are coupled together by the action of their radial vanes. Then centrifugal force depends on the rotary speed of the impeller 11 and therefore the fore of the coupling varies in proportion to the speed of the impeller. In other words, the force that is transmitted through the coupling increases as the impeller's speed increases and decreases as the impeller's speed decreases. Thus the shaft 10 forms a rotary torque reaction shaft.

Means for intergearing the rotary output and reaction shafts 6 and 10 is provided by a planetary gear train. This includes a sun gear 12 fixed to the impeller's hub 10 to rotate the latter, a ring gear 13, and one or more planet gears 14. Each planet gear 14 is fixed on a rotary planet shaft 15 journalled by a planet carrier 16. This carrier 16 has a hub 16a journalled on the outside of the tubular bearing 4. A tubular drive shaft 17, having a diameter almost as large as that of the inside of the casing 1, rotatively connects the ring gear 13 with the output shaft 6.

Rotation of the carrier 16 causes shafts 6 and 10 to contra-rotate with the shaft 10 turning much faster than the shaft 17 with the ratio between the two speeds fixed by the planetary gear train.

A second planetary gear train intergears the shaft 5 and the carrier 16 of the first described train. This second train includes a sun gear 18 fixed on the end of the shaft 5 for rotation thereby, and one or more panet gears 19 journalled on planet shafts 20 mounted by a planet carrier 21. This planet carrier 21 connects rotatively with the planet carrier 16, through a tubular shaft 22 which rotates freely inside of the larger tubular shaft 17. One end of this tubular shaft 22 is supported by being connected to the carrier 16 which may itself be in journalled relation relative to the tubular shaft 17. The other end of the tubular shaft 22 is journalled on the outside of the end of the shaft 6. A ring gear 23 completes this second planetary gear train.

If this ring gear 23 were to be held stationary, rotation of the shaft 5 would rotate the sun gear 18, the planet gears 19 would revolve and rotate the carrier 21 at a reduced speed, and through the tubular shaft 22, would rotate the carrier 16 of the first gear train. As this carrier 16 is rotated, the planet gears 14 revolve and would drive the sun gear 12 in one direction and the ring gear 13 in the opposite direction. Consequently, the shaft 5 and 6 would contra-rotate.

When, instead of being held stationary, the ring gear 23 is rotated in a direction opposite to that of the rotation of the shaft 5, the carrier 21 and therefore the carrier 16 are rotated at a more reduced speed. If the ring gear 23 is rotated in the same direction but more rapidly than the shaft 5 is turned, the carriers 21 and 16 rotate faster than when the ring gear 23 is held stationary. If the ring gear 23 is rotated in the same direction and at the same speed as the shaft 5, the carriers 21 and 16 also rotate at the same speed.

Although the ratio between the input and both the output reaction members' speeds is fixed, their differential speeds relative to the speed of the input shaft 5 may vary widely. Correspondingly the rotative speeds of the planet gears 14 on their own axes may vary widely regardless of the speeds with which these planet gears revolve about the axis of their carrier.

The ring gear 23 is intergeared with the planet gears 14 by a third planetary gear train. This third train includes a ring gear 24 rotatively connected to the ring gear 23, the two ring gears being a single piece and having a common hub 25 journalled to rotate on the shaft 5. One or more planet gears 26 connect the ring gears 23 and 24 with a stationary sun gear 27 formed on the end of the tubular bearing 4. Since this sun gear 27 connects through the tubular bearing with the casing 1, this gear 27 provides the torque reaction required by the ring gear 23. The planet gears 26 rotate on studs 28 mounted by a planet carrier 29 having a hub 30 by which it is journalled to rotate partly on the hub 16a and partly on the tubular bearing 4. The two carriers 29 and 16 are free to rotate relative to each other. Rotation of the carrier 29 rotates the ring gears 23 and 24.

Rotation of the carrier 29 is effected by a sun gear 31 driven by one or more planet gears 32 which are fixed to the planet shafts 15 of the planet gears 14 for rotation thereby.

The sun gears 18 and 27, the ring gears 23 and 24, and the planet gears 19 and 26, all have diameters that correspond to each other. The sun gear 31 and planet gears 32 serve to transmit the rotation of the planet gears 14 on their own axes to the planet carrier 29, as the planetary gears 14 revolve about the axis of the planet carrier 16.

In operation, with a load on the output shaft 6 forward rotation of the input shaft 5 through the train of gears 18, 19 and 23, causes forward rotation of the planet carrier 16 or backward rotation of ring gear 23 or both. Backward rotation is imparted to the impeller 11 of the hydraulic coupling. The carrier 16 is driven at a reduced speed relative to the speed of the shaft 5, and this speed is reduced as it is applied to the ring gear 13 and increased to a great degree as applied by the planet gears 14 to the sun gear 12 as a result of the load on the output shaft 6 which results in the sun gear 12 being driven backwards by gears 24, 26 and 27, the latter gear being anchored to the casing 1, to give this result. Therefore, a small torque reaction applied by the casing 1 through the hydraulic coupling can balance a large application of torque to the output shaft 6.

As the planet gears 14 revolve their rotation is transmitted by the planet gears 32 and sun gear 31 to the planet carrier 29 which is driven in a backwards direction relative to the direction of the drive shaft 5. Therefore, the planet gears 26 rotate the ring gears 24 and 23 backwards, a speed reduction being involved. This in turn reduces the rotative speed of the planet carrier 21 and therefore of the ring gear 13 and the shaft 6 driven by this ring gear.

As the gear ratio of the system varies the necessary torque reaction is transmitted to the casing or stator 1 through the stationary sun gear 27. This gear provides part of the torque reaction required by the system.

With increasing speed of the drive shaft 5, the torque reaction provided by the hydraulic coupling and applied to the output shaft 6 eventually overcomes the load reaction. As the torque requirement of the load reduces, the speed of the shaft 6 automatically picks up with the speed and therefore the torque reaction of the rotary reaction member or shaft 10 reducing as required to maintain a balance.

The torque paths of travel through this system are somewhat complicated. Torque on the sun gear 18 is transmitted through the gearing to the planet carrier 16 with the necessary torque reaction being provided by the stator through the stationary sun gear 27. Torque travels from the carrier 16 in opposite directions to the two shafts 6 and 10, the torque thus dividing in proportions determined by the relative speeds of the shafts 6 and 10. The reaction of these torque differences can travel through either of the planet carriers 16 and 21 back to either of the planet gears 19 and 26, or in other words, back to the input. The torque reaction of the stationary gear 27 is also applied to these planet gears 19 and 28.

It is interesting to note that none of the torque applied to the shaft 6 originates from the input shaft 5. The latter is, in effect, isolated. The casing or stator 1 provides all of the torque reaction as applied through the hydraulic coupling.

As the speed of the controlled reaction shaft 10 decreases, due to a reduction in the load torque on the output shaft 6, the speed of the backward rotation of the ring gear 23 decreases until ultimately this gear 23 becomes stationary. If the speed of the shaft 6 then increases further relative to the speed of the shaft 10, the ring gear 23 moves forwardly in the same direction as the shafts 5 and 6 rotate, a condition of overdrive then existing. This is the opposite extreme of a condition where the shaft 6 is very heavily loaded and the input shaft 5 is rotated at a very high speed. In this case the ring gear 23 is rotated forward relatively fast so that the gear reduction effect between the shafts 5 and 6 is reduced. The load transmission of the hydraulic coupling is reduced or reversed.

The planetary gearing can be varied.

An example of such variation is shown by FIG. 2. Most of the parts in this example correspond to those of the first example and are correspondingly numeraled with the small letter "a" providing separate identification.

Note that in this second example the ring gears 23a and 24a are separated from each other, and that it is the planet gears 19a and 26a that are mounted on a common carrier 21a which is free to rotate on the shaft 5a independently of the other parts. This change results in reversing the rotation of planet carrier 16a with respect to the shaft 5a.

The sun gear 31a is not connected directly to the carrier 29a, the ring gear 24a in this case controlling the rotating speed of the common planet gear carrier 21a which by controlling the revolving speed of the planet gears 19a varies the ratio between the shaft 5a and the tubular shaft 22a which is here driven directly by the ring gear 23a.

In this second example the planet gears 32a also engage a ring gear 33 which, like the sun gear 31a, is free to rotate relative to the other parts.

A simple dog clutch is shown, the ring gear 33 having dogs 34 and the sun gear 31a having dogs 35. A shifting clutch plate 36 has apertures for receiving either of the sets of dogs when shifted into engagement therewith, this clutch member being slidably keyed or splined to the carrier 30a of the ring gear 24a. A hand lever 37 on the outside of the transmission casing may be used to swing a forked lever 38 on the inside of the transmission casing and having pins 39 which connect with a cage 40 which engages a flange 41 on the end of the clutch member 36 so that the latter may be shifted while allowed to rotate relative to the cage.

When the clutch member 34 is engaged with the part 36, output shaft 6a will rotate in a direction opposite to the gear 23a or in the same direction as the input shaft 5a. When member 36 is engaged by the part 35 the output shaft 6a will rotate in the same direction as the part 16a or in a direction opposite to that of the input shaft 5a.

Other parts operate substantially as described in connection with the first example.

I claim:

1. An automatic rotary power transmission comprising structure forming a stationary housing; a rotary input member; a rotary output member; a rotary reaction member; a planetary gear train for intergearing said output member and said reaction member for contra-rotation, said planetary gear train including a sun gear rotatively connected to one of said output member and said reaction member, and a ring gear rotatively connected to the other of said output member and said reaction member, and at least one planet gear; means for gearing said input member to the planet gear of said planetary gear train to revolve the planet gear so that the rotative speeds of said output member and said reaction member are free to vary relative to the input member, a portion of said gearing means being fixed with respect to said stationary housing; and means for applying to said reaction member a torque reaction that varies in proportion to its speed, a portion of said torque reaction applying means being fixed with respect to said stationary housing.

2. The transmission of claim 1 in which said gearing means includes a planetary gear train comprising a sun gear rotatively connected to said input shaft and a ring gear and at least one planet gear and means for rotatively connecting in a predetermined sense the motion of one of the just said planet and ring gears with the planet gear of the first-named planet gear train.

3. The transmission of claim 2 in which said motion connecting means includes a planetary gear train comprising a stationary sun gear and a ring gear and at least one planet gear, one of the last named ring and planet gears being rotatively connected to said remaining gear of the second-named planetary gear train and the other being rotatively connected to said planet gear of the first-named planetary gear train.

4. An automatic rotary power transmission comprising structure forming a stationary housing; a rotary input member; a rotary output member; a rotary reaction member; a first planetary gear train for intergearing said output member and said reaction member for contra-rotation, said planetary gear train including a sun gear, a ring gear, and a planet gear, one of said gears being rotatively connected to one of said output member and said reaction member, another of said gears being rotatively connected to the other of said output member and said reaction member; a second planetary gear train for gearing said input member to the planet gear of said first planetary gear train to revolve the planet gear so that the rotative speeds of said output member and said reaction member are free to vary relative to the input member, said second planetary gear train including a sun gear, a ring gear, and a planet gear, one of the gears of said second planetary gear train being rotatively connected to said input member, another gear thereof being rotatively connected to the remaining one of said gears of said first planetary gear train, and means for rotatively connecting in a predetermined sense the rotary motion of the remaining gear of said second planetary gear train to the remaining gear of said first planetary gear train, a portion of said rotatively connecting means being fixed with respect to said stationary housing; and means for applying to said reaction member a torque reaction that varies in proportion to its speed, a portion of said torque reaction applying means being fixed to said stationary housing.

5. The transmission of claim 4 in which said motion connecting means includes a planetary gear train comprising a stationary sun gear and a ring gear and at least one planet gear, one of the last named ring and planet gears being rotatively connected to said remaining gear of the second-named planetary gear train and the other being rotatively connected to said planet gear of the first-named planetary gear train.

6. An automatic rotary power transmission including a stator for receiving torque reaction, an input shaft, an output shaft, a rotary torque reaction shaft having means for connecting it with said stator to receive a torque reaction therefrom which varies in proportion to the speed of this reaction shaft, a first planetary gear train including a sun gear connected to said reaction shaft and a ring gear connected to said output shaft and at least one planet gear having a carrier, a second planetary gear train including a sun gear rotatively connected to said input shaft and a ring gear and a planet gear having a carrier, one of said carrier and ring gear of this second train being rotatively connected to the planet carrier of the first train, a third planetary gear train including a sun gear mounted stationary to said stator and a planet gear having a carrier and a ring gear, one of said carrier and ring gear of this third train being connected to the other one of said carrier and ring gear of said second train, and means for rotatively connecting rotary motion of the planet gear of said first train to the other one of said carrier and ring gear of said third train.

7. The transmission of claim 6 and including means for reversing the rotation of said rotary motion transmitted by the last named means.

8. An automatic rotary power transmission including a stator for receiving torque reaction, an input shaft, an output shaft, a rotary torque reaction shaft having means for connecting it with said stator to receive a torque reaction therefrom which varies in proportion to the speed of this reaction shaft, a first planetary gear train including a sun gear connected to said reaction shaft and a ring gear connected to said output shaft and at least one planet gear having a carrier, a second planetary gear train including a sun gear rotatively connected to said input shaft and a ring gear and a planet gear having a carrier, one of said carrier and ring gear of this second train being rotatively connected to the planet carrier of the first train, a third planetary gear train including a sun gear mounted stationary to said stator and a planet gear having a carrier and a ring gear, one of said carrier and ring gear of this third train being connected to the other one of said carrier and ring gear of said second train, and an additional gear train including a gear rotatively connected to the planet gear of said first train and an additional gear engaged with said sun gear and rotatively connected to the other one of said carrier and ring gear of said third train.

9. An automatic rotary power transmission including a stator for receiving torque reaction, an input shaft, an output shaft, a rotary torque reaction shaft having means for connecting it with said stator to receive a torque reaction therefrom which varies in proportion to the speed of this reaction shaft, a first planetary gear train including a sun gear connected to said reaction shaft and a ring gear connected to said output shaft and at least one planet gear having a carrier, a second planetary gear train including a sun gear rotatively connected to said input shaft and a ring gear and a planet gear having a carrier, one of said carrier and ring gear of this second train being rotatively connected to the planet gear of the first train, a third planetary gear train including a sun gear mounted stationary to said stator and a planet gear having a carrier and a ring gear, one of said carrier and ring gear of this third train being connected to the other one of said carrier and ring gear of said second train, and a fourth planetary gear means including a sun gear and a ring gear and a planet gear connected to the planet gear of said first train, and means for rotatively connecting rotary motion of the other of said carrier and ring gear of said third train to one of said sun and ring gears of said fourth train.

10. An automatic rotary power transmission comprising a rotary input member and rotary output and reaction members, means for applying to one of said output and said reaction members a torque reaction that varies in proportion to its speed, a first planetary gear train for intergearing said output and said reaction members for contra-rotation, said first gear train including sun, ring and planet gears, one of said gears being rotatively connected to the one of said output and reaction members and another of said gears being rotatively connected to the other of said output and reaction members, a second planetary gear train including sun, ring and planet gears, one of said gears being rotatively connected to said input member and another of said gears being rotatively connected to the remaining one of said gears of said first planetary gear train, a third planetary gear train including sun, ring and planet gears, one of said gears being stationary with respect to said torque reaction applying means and another of said gears being rotatively connected to the remaining gear of said second gear train, and means for rotatively connecting the remaining gear of said third gear train to said remaining gear of said first gear train.

11. An automatic rotary power transmission comprising a rotary input member and rotary output and reaction members, means for applying to one of said output and said reaction members a torque reaction that varies in proportion to its speed, a first planetary gear train for intergearing said output and said reaction members for contra-rotation, said first gear train including sun, ring and planet gears, one of said gears being rotatively connected to the one of said output and reaction members and another of said gears being rotatively connected to the other of said output and reaction members, a second planetary gear train including sun, ring and planet gears, one of said gears being rotatively connected to said input member and another of said gears being rotatively connected to the remaining one of said gears of said first planetary gear train, a third planetary gear train including sun, ring and planet gears, one of said gears being stationary with respect to said torque reaction applying means and another of said gears being rotatively connected to the remaining gear of said second gear train, and means for rotatively connecting in a selectable relative sense of rotation the remaining gear of said third gear train to said remaining gear of said first gear train, whereby the relative sense of rotation of said output members and said input member can be predetermined.

12. An automatic rotary power transmission comprising a rotary input member and rotary output and reaction members, means for applying a torque reaction that varies in proportion to its speed, a first planetary gear train for intergearing said output and reaction members for contra-rotation, one portion of said first gear train being rotatively connected to one of said output and reaction members, and another portion thereof being connected to the other of said output and reaction members, a second planetary gear train, one portion of said second planetary gear train being rotatively connected to said input member and another portion thereof being connected to an additional portion of said first gear train, a third planetary gear train, one portion of said third gear train being stationary with respect to said torque reaction applying means and another portion thereof being connected to an additional portion of said second train, and means for rotatively connecting an additional portion of said third gear train to an additional portion of said first gear train.

References Cited by the Examiner
UNITED STATES PATENTS

| | | | |
|---|---|---|---|
| 2,341,512 | 2/44 | Burtnett | 74—782 X |
| 2,343,509 | 3/44 | Jandasek | 74—782 |
| 2,390,626 | 12/45 | Szekely | 74—782 X |
| 2,467,226 | 4/49 | Place | 74—705 X |

DON A. WAITE, *Primary Examiner.*

BROUGHTON G. DURHAM, *Examiner.*

UNITED STATES PATENT OFFICE
CERTIFICATE OF CORRECTION

Patent No. 3,215,004 November 2, 1965

Charles Bancroft

It is hereby certified that error appears in the above numbered patent requiring correction and that the said Letters Patent should read as corrected below.

Column 1, line 55, for "its" read -- it --; column 2, line 1, for "except" read -- excepting --; line 18, after "output", second occurrence insert -- shaft --; line 33, for "Then" read -- The --; line 34, for "fore" read -- force --; same column 2, line 58, for "panet" read -- planet --; column 3, line 5, for "shaft" read -- shafts --.

Signed and sealed this 5th day of July 1966.

(SEAL)
Attest:

ERNEST W. SWIDER
Attesting Officer

EDWARD J. BRENNER
Commissioner of Patents